(No Model.)
S. W. ROBINSON & S. P. WATT.
STRAIGHT EDGE TRIMMER.
No. 389,529. Patented Sept. 11, 1888.
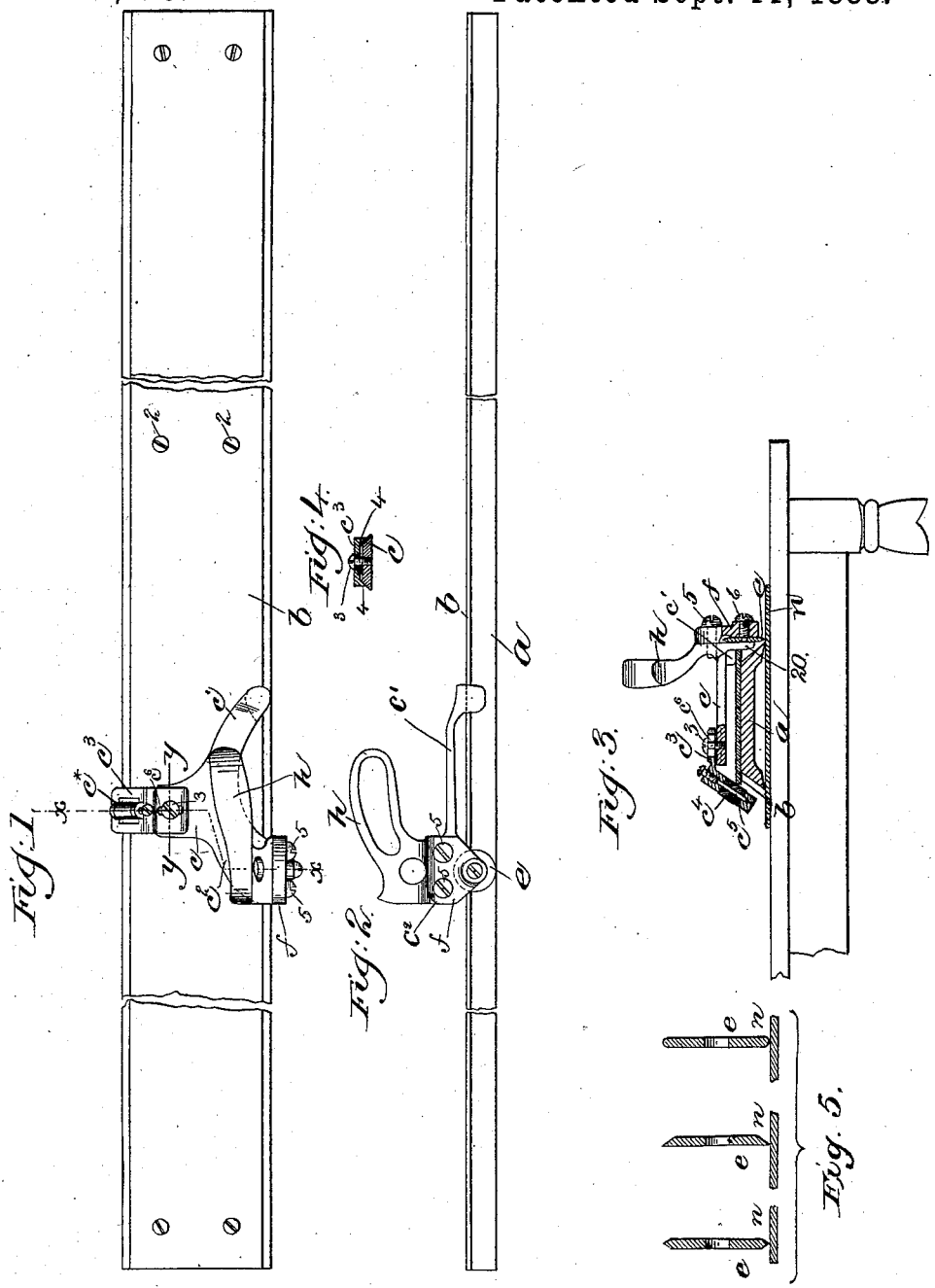
Witnesses
C. M. Cone.
Fred L. Emery
Inventors
Stillman W. Robinson
Serr P. Watt
by Crosby & Gregory
Attys

UNITED STATES PATENT OFFICE.

STILLMAN W. ROBINSON AND SERN P. WATT, OF COLUMBUS, OHIO, ASSIGNORS, BY DIRECT AND MESNE ASSIGNMENTS, TO JAMES S. BATTERSON AND MARTIN HENSIL, OF SAME PLACE.

STRAIGHT-EDGE TRIMMER.

SPECIFICATION forming part of Letters Patent No. 389,529, dated September 11, 1888.

Application filed March 22, 1887. Serial No. 231,894. (No model.)

*To all whom it may concern:*

Be it known that we, STILLMAN W. ROBINSON and SERN P. WATT, of Columbus, county of Franklin, and State of Ohio, have invented an Improvement in Straight-Edge Trimmers, of which the following description, in connection with the accompanying drawings, is a specification, like letters on the drawings representing like parts.

The object of this invention is to produce for wall-paper hangers' use a portable and convenient edge-trimmer for accurately trimming strips of wall-paper to a straight line.

The invention, as hereinafter set forth and claimed, consists in a trimmer composed of a carriage with arms or projections to work in contact with the edge of a guiding straight-edge while in operation, said carriage having attached to it a trimming-wheel running upon a hard bed-plate to sever the paper, and also a handle by which the trimmer is moved along the straight-edge. The straight-edge consists of a straight strip of metal, preferably mounted on a base of wood, the same when in use to lie on the paper being trimmed. The hard bed-plate consists of a plate of glass, sheet-iron, or steel, which the trimming-wheel will not dent or mark appreciably in use, said plate being laid flat on a table.

Figure 1 shows in top view, separate from the table, a trimmer and straight-edge embodying this invention; Fig. 2, a side elevation of the trimming apparatus shown in Fig. 1; Fig. 3, a cross-section of the trimming apparatus shown in Fig. 1, taken on the dotted line $x\,x$, the said figure also showing in section the hard bed-plate, all in working position; Fig. 4, a sectional detail of one of the arms of the trimmer, taken on the dotted line $y\,y$, Fig. 1; and Fig. 5 illustrates several ways of forming the blunt edge of the trimmer-wheel.

$a$ is the base-strip; $b$, the straight-edge proper formed of an accurately-straightened metal strip of any desired length or thickness, and serving as the guiding-track, upon which the trimmer slides straight and in parallelism while trimming paper.

For convenience in handling the straight-edge the strip $b$ is secured by screws 2 upon the base-strip $a$. This base-strip is made narrower at the top than the strip $b$, so that the strip $b$ shall present overhanging edges to the fingers of the operator for convenience in lifting the straight-edge for placing it in position. The lower side of the base-strip $a$ extends to the edge of the trimmer-wheel, as best shown in Fig. 3.

The trimmer is shown as consisting of a carriage, $c\,c'\,c^2$, bearing on opposite sides of the straight-edge $b$, the arm $c'$ being extended down upon and over the front edge of strip $b$, so as to secure a top and edge bearing upon strip $b$. The arm $c$ has connected with it by the screw 3 the extension-piece $c^3$, which is provided with a slot, $c^6$, through which the screw 3 extends, as shown in Figs. 1, 3, and 4, and whereby said extension-piece may be adjusted to suit various widths of straight-edge. As shown in Fig. 4, the arm $c$ may be beveled and the extension-piece $c^3$ be provided with beveled lips 4, matching the bevel of the arm $c$, to assist the screw 3 in obtaining a firm bearing of the extension-piece upon the arm $c$. An anti-friction roller, $c^4$, is journaled to piece $c^3$ by the pin $c^5$, said roller being inclined so as to bear diagonally upon the back edge or corner of strip $b$. The arm $c^2$ has no top bearing, but extends down in the lip 20 for an edge-bearing upon strip $b$ when the base-strip $a$ is employed, as shown in Fig. 3. The arm $c^2$ has secured to it by screws 5 the block $f$, between which and the lip 20, in a suitable recess, is mounted the trimming-wheel $e$, to revolve freely on the pin 6, passing through said block.

The downward pressure of the arm $c^2$ is not resisted by the straight-edge $b$, as is the case with the other arms, but is borne by the trimmer-wheel $e$, the latter being in turn pressed down upon the hard plate $n$, this pressure between wheel $e$ and plate $n$ being utilized in trimming the paper, and the top bearing of the arm $c^2$ on the straight-edge $b$ is omitted, as shown in Fig. 3, in order to utilize this pressure.

The hard bed-plate $n$, placed upon the table to trim on, is preferably made of hardened sheet-steel, and the edge of the trimming-wheel $e$ is not thin and knife-like, but is made of some blunt form, as shown in Fig. 5, preferably the single-beveled form for heavy butt-joint work, and is very hard, whereby in the action of one upon the other great durability, efficiency, and certainty are secured in trimming gritty, wet, or pasted paper.

The carriage is provided with a suitable handle, $h$, whereby it may be moved by hand at will on the straight-edge, or be lifted therefrom and set to one side when handling the straight-edge.

What we claim is—

1. In an edge-trimmer for trimming wall-paper, a hard bed-plate, a straight-edge shaped to constitute a track, and its portable base strip or support to rest directly upon and hold the paper to be trimmed, and a carriage having arms bearing at each side of the said straight-edge or track to guide the carriage when in operation, combined with a hard blunt-edge trimming-wheel working on the top surface of said hard bed-plate, to operate all substantially as described.

2. In an edge-trimmer for trimming wall-paper, the following elements, in combination, viz: a portable straight-edge consisting of a straightened metallic guide-strip or track mounted on a base-strip, and a carriage having arms, two of the arms bearing one upon each side of the guide or track, to thereby serve as guides for the carriage, the third arm carrying the blunt-edge trimming-wheel, and a handle connected with the carriage to move the same upon the track, the whole being adapted to trim the edge of the paper at an angle, substantially as described.

3. In a paper-trimming apparatus for paper-hangers' use, the portable straight-edge for guiding a carriage moving thereon, and a carriage one of the supporting-arms of which is made adjustable for adapting it to the straight-edge, combined with a hard blunt-edge trimming-wheel attached to the carriage and working on a hard bed-plate, substantially as described.

In testimony whereof we have signed our names to this specification in the presence of two subscribing witnesses.

STILLMAN W. ROBINSON.
SERN P. WATT.

Witnesses:
ALEXIS COPE,
W. A. WALDEN.